US012382268B2

United States Patent
Bradley et al.

(10) Patent No.: US 12,382,268 B2
(45) Date of Patent: Aug. 5, 2025

(54) PREDICTIVE PERSONAL THREAT LEVELS VIA USER DEVICE

(71) Applicant: AT&T Intellectual Property I, L.P., Atlanta, GA (US)

(72) Inventors: Nigel Bradley, Canton, GA (US); Eric Zavesky, Austin, TX (US); James Pratt, Round Rock, TX (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 553 days.

(21) Appl. No.: 17/662,311

(22) Filed: May 6, 2022

(65) Prior Publication Data

US 2023/0362610 A1  Nov. 9, 2023

(51) Int. Cl.
*H04W 4/90* (2018.01)
*H04W 4/029* (2018.01)

(52) U.S. Cl.
CPC .............. *H04W 4/90* (2018.02); *H04W 4/029* (2018.02)

(58) Field of Classification Search
CPC .................................. H04W 4/90; H04W 4/02
USPC ........................................................ 455/404.2
See application file for complete search history.

(56) References Cited

U.S. PATENT DOCUMENTS

| 8,121,582 | B2 * | 2/2012 | Coskun ................... H04L 51/58 455/518 |
| 10,964,191 | B2 * | 3/2021 | Jati ......................... G08B 25/08 |
| 2012/0064910 | A1 * | 3/2012 | Cornett ................... H04W 4/90 455/456.1 |
| 2013/0214939 | A1 * | 8/2013 | Washlow ................. B60Q 9/00 340/901 |
| 2019/0007820 | A1 * | 1/2019 | Keil ....................... G08B 25/005 |
| 2020/0043117 | A1 * | 2/2020 | Kern Mainieri Trevisan ............. H04W 4/029 |

* cited by examiner

*Primary Examiner* — Qutbuddin Ghulamali
(74) *Attorney, Agent, or Firm* — Guntin & Gust, PLC; Erik Boyd

(57) ABSTRACT

The disclosed technology is directed towards detection of personal threats to a user based on information known to a user's device and other information. A device with a personal threat application program and server communicate information, including data describing the user's current physical situation, e.g., including current location. The server and/or application program obtain data describing environmental conditions around the user's location, e.g., corresponding to a defined personal zone. The personal zone size automatically can vary based on current factors. Based on the situation and environmental data reaching a threshold threat level, a potential threat to the user can be predicted and the prediction, used to take some action, such as to send an alert to the user and/or otherwise output a warning signal. Historical data such as statistics related to the user's current location can be accessed to assist with the prediction.

20 Claims, 13 Drawing Sheets

PREDICTIVE PERSONAL THREAT LEVELS VIA USER DEVICE

TECHNICAL FIELD

The subject application relates to devices and sensors in general, and more particularly to predicting personal threats to users, and related embodiments.

BACKGROUND

A user of a device such as a smartphone or wearable may experience a threat to their bodily safety from one or more sources. Such threats of possible danger may not be apparent to the user, who may therefore not otherwise know that there is a potential need to take remediating actions against the threats.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
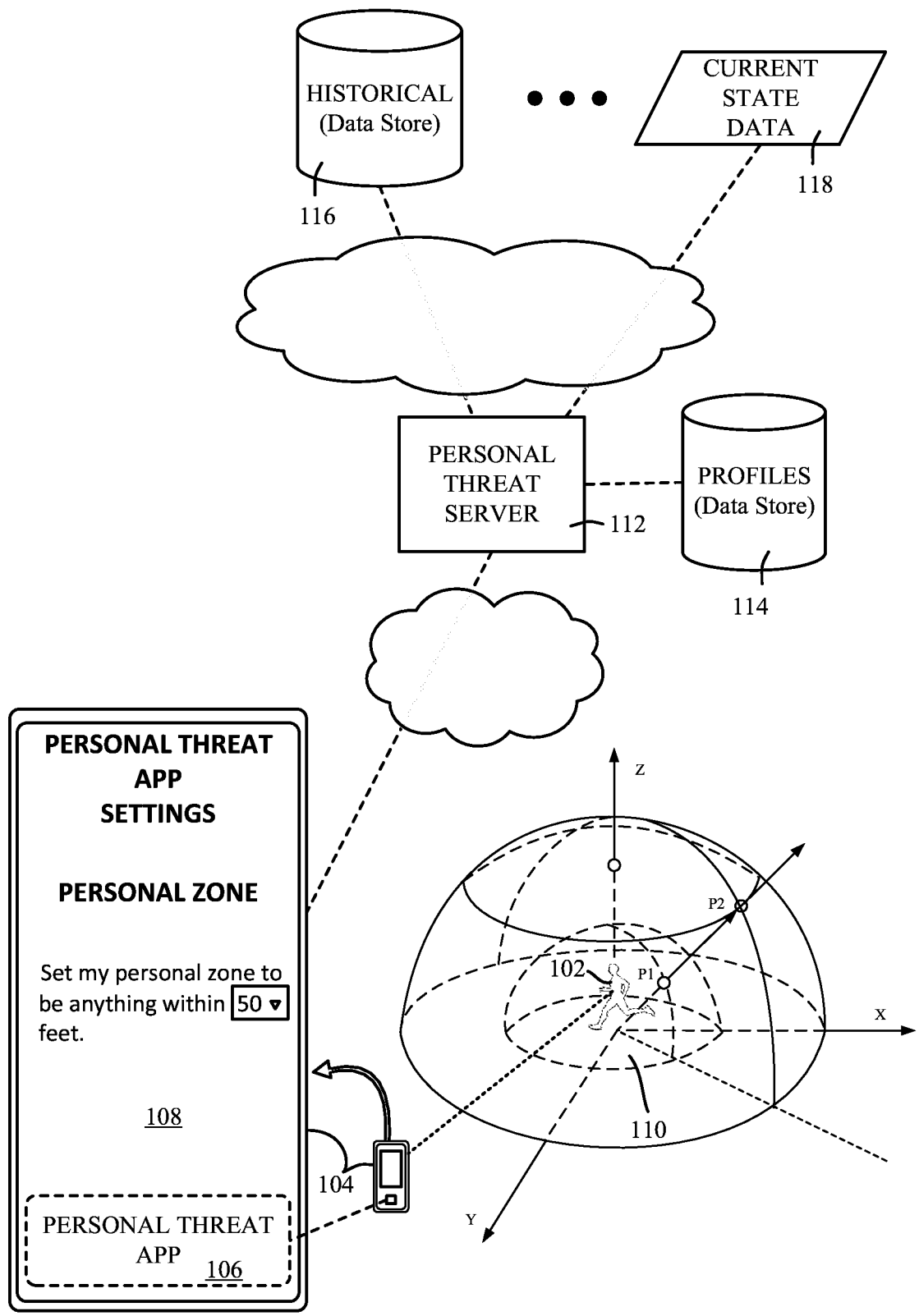
FIG. 1 is a block diagram of an example system for predicting a threat to a user with a device, in accordance with various aspects and embodiments of the subject disclosure.

The technology described herein is generally directed towards the prediction of potential threats, which can include levels of potential threats, to a user's bodily safety. As described herein, a threat or threat level can be predicted based on a user's detected situation data (e.g., including current location), one or more electronically sensed environment (conditions) data. Data can also be retrieved from one or more data stores and used to make a threat level prediction; for example, historical crime or traffic data near the user can be accessed to help analyze the situational and environmental data to determine a current threat level.

When a threat is detected, the user may be alerted of his or her present or predicted future threat/threat level and take one or more remediating actions to help avoid the threat. Additionally, a defense system may be automatically engaged, such as when a predicted threat level reaches a threshold level.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows a general system architecture 100 in which a user 102 is equipped with a communication device 104 (shown both as a smaller device as well as in an enlarged depiction). The device may be a smartphone as depicted in FIG. 1, but may include or be coupled to a wearable device or the like that may be clipped on or worn by the user.

The device 104 shown in FIG. 1 runs a personal threat application program (app) 106, which has a number of interactive interfaces described herein, such as the example interactive interface 108 in FIG. 1. In this example interface 108, the user can interact to set boundaries of a personal zone, e.g., the zone 110 in FIG. 1.

As shown in FIG. 1, the personal threat app 106 may be in communication with a personal threat server 112 over a network. The personal threat server may have access to a profile for the user (e.g., in profiles data store 114) and other users of the service. When the app 106 is in use, it registers with the personal threat server 112 and activates a profile that contains information such as including a unique identifier (ID) for the user, the location of the user device (e.g., frequently updated so as to be relatively current), and a record of defensive capabilities of the device. The personal threat server 112 also can access profile data for other users, which may be helpful to the first user as described herein.

The personal threat server 112 also can access other data, such as historical data in a data store 116, and current state data 118 based on the user's current location. Non-limiting examples of state data may be the number and type of external sensors and alarms near the user's current location, the temperature and humidity or other conditions (e.g., allergen levels) near the user's current location and so forth, because not all devices that a user may currently have may have such onboard sensing capabilities.

The user may exist in a point in space as defined by the X, Y, Z (latitude, longitude, altitude) coordinates of the device 104. Other geographic coordinate location methodologies may also be used. These coordinates may be sent from the device 104 using the personal threat app 106 to the personal threat server 112 and stored in the user's profile data in the data store 114.

As set forth herein, via the interactive interface 108 the user may access settings on the personal threat app 106 to define an area that represents the user's personal zone. The personal zone may be represented a three-dimensional space emanating outward from the communication device as a center-point. In the example shown, the personal zone may be comprised of all X, Y, Z coordinates that exist in a three-dimensional sphere that include points that are 50 feet or less from the device (where P1 is 50 feet). These points or these ranges of points may be saved as the personal zone for the user in their profile.

Note that although the personal zone 110 is shown as a hemisphere dome with a defined radius in FIG. 1, the zone can be a full sphere or other defined region (e.g., by a set of coordinates). A zone can also be truncated based on location; for example a user in a parking garage with ten-foot ceilings does not necessarily want to be warned about what is occurring eighty feet above him, but does want to know what is within eighty feet around him, up to ten feet above him. In such a situation, a zone can be adjusted to have an eighty-foot two-dimensional radius that goes up to ten feet high in the vertical direction. Alternatively a cylindrical zone or other geometric polyhedron can cover such a region.

Figure 2:
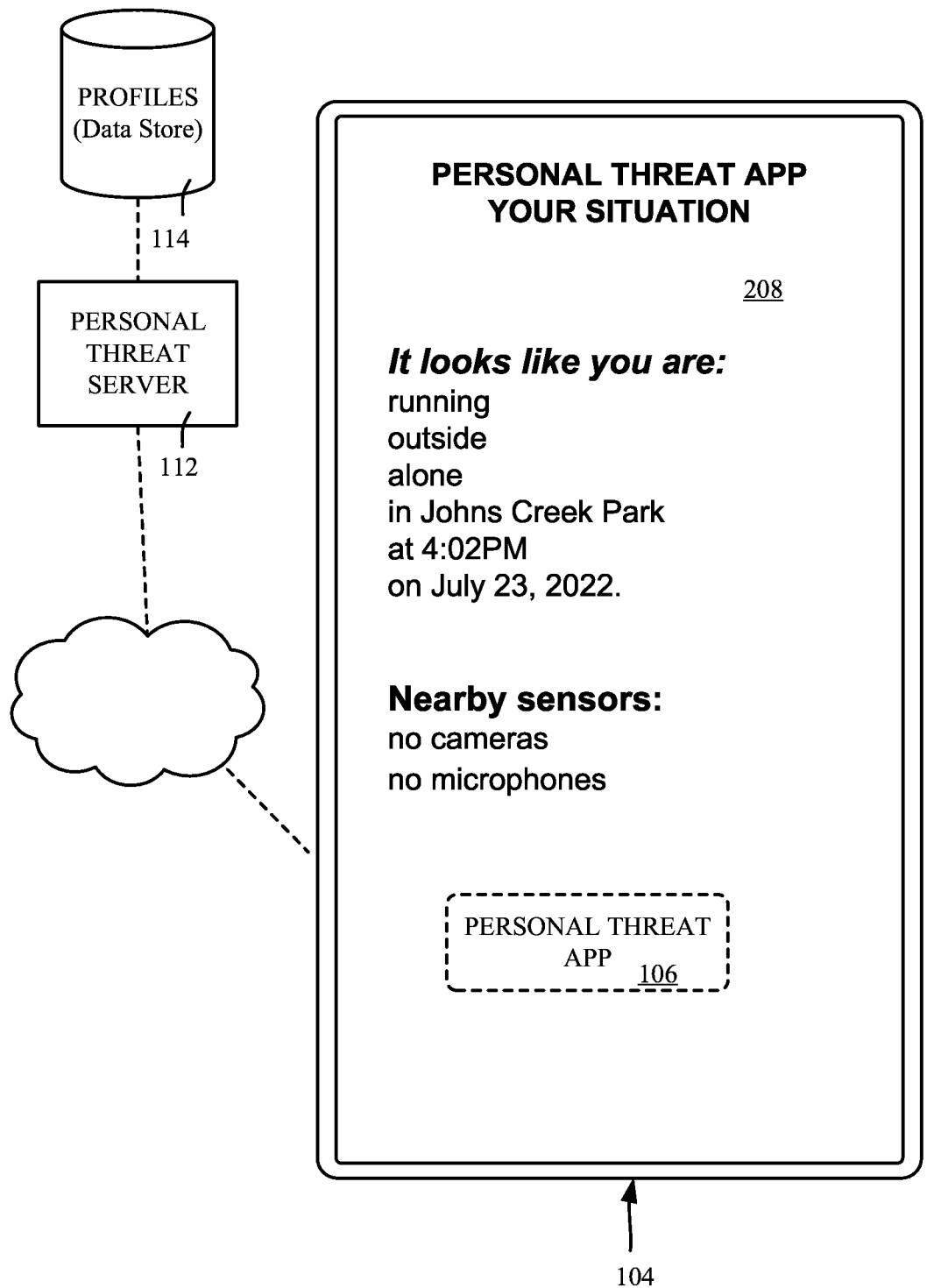
FIG. 2 is a representation of an example user interface by which a user can view his or her current situation, in accordance with various aspects and embodiments of the subject disclosure.

One consideration in the determination of a threat level to a user is the user's current situation. In the example of FIG. 2, the personal threat app 106 in communication with the personal threat server 112 may make a continuous or regular determination of the user's situation. This may be based on a number of factors, including the user's location, biometric sensors and other health data, other apps sensed and saved on the device, mapping data, and other data.

The personal threat server and app may also make a prediction as to whether the user is inside or outside. This may be based on a database of geographic coordinates that contain ranges of X, Y, Z coordinates that are known to be indoors and those that are known to be outdoors. In the example personal threat app's interface 208 of FIG. 2, based on various sensors and the time and location of the device, the user's situation is determined to be running, outside, alone, in Johns Creek Park at 4:02 PM on Jul. 23, 2022. Although not explicitly shown in FIG. 2, it is feasible for the runner to interact with the interface to correct any information, e.g., the user may be running with a companion whose presence is not detected.

Figure 3:
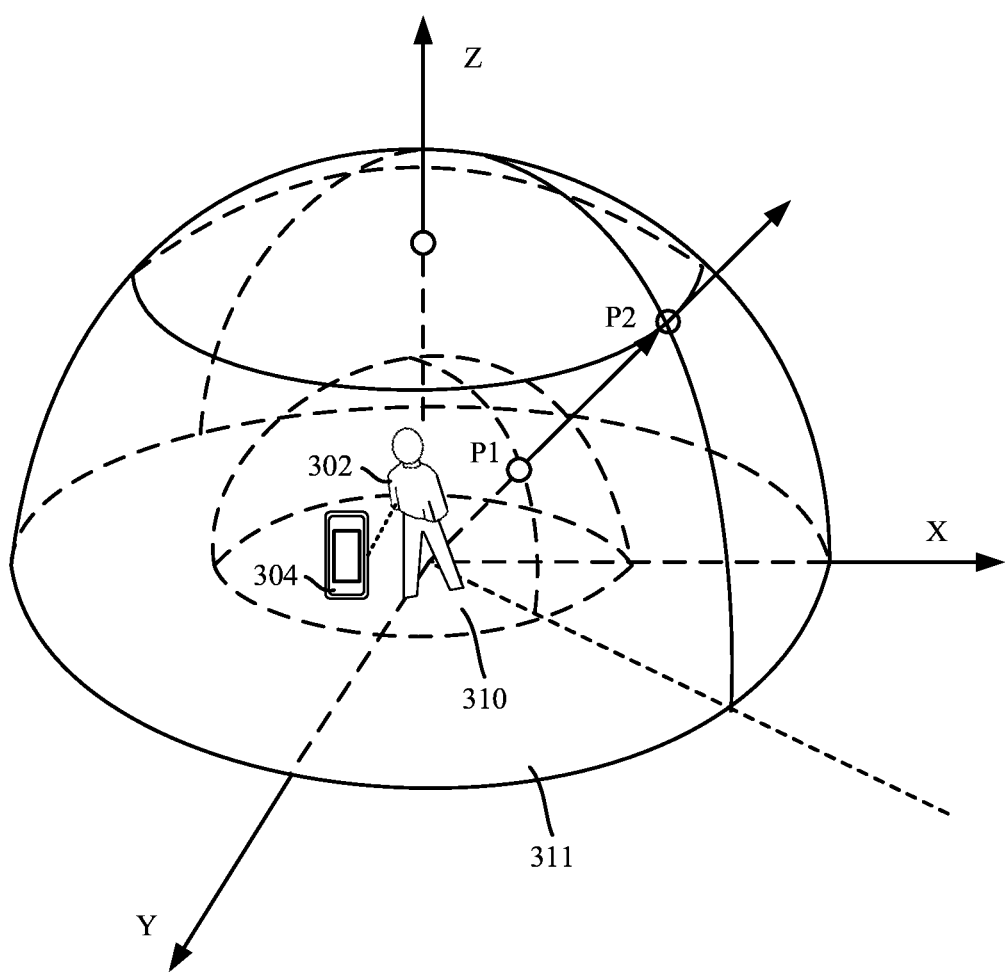
FIG. 3 is a representation of a user within protective personal zones with respect to sensing one or more potential personal threats, in accordance with various aspects and embodiments of the subject disclosure.
Figure 4:
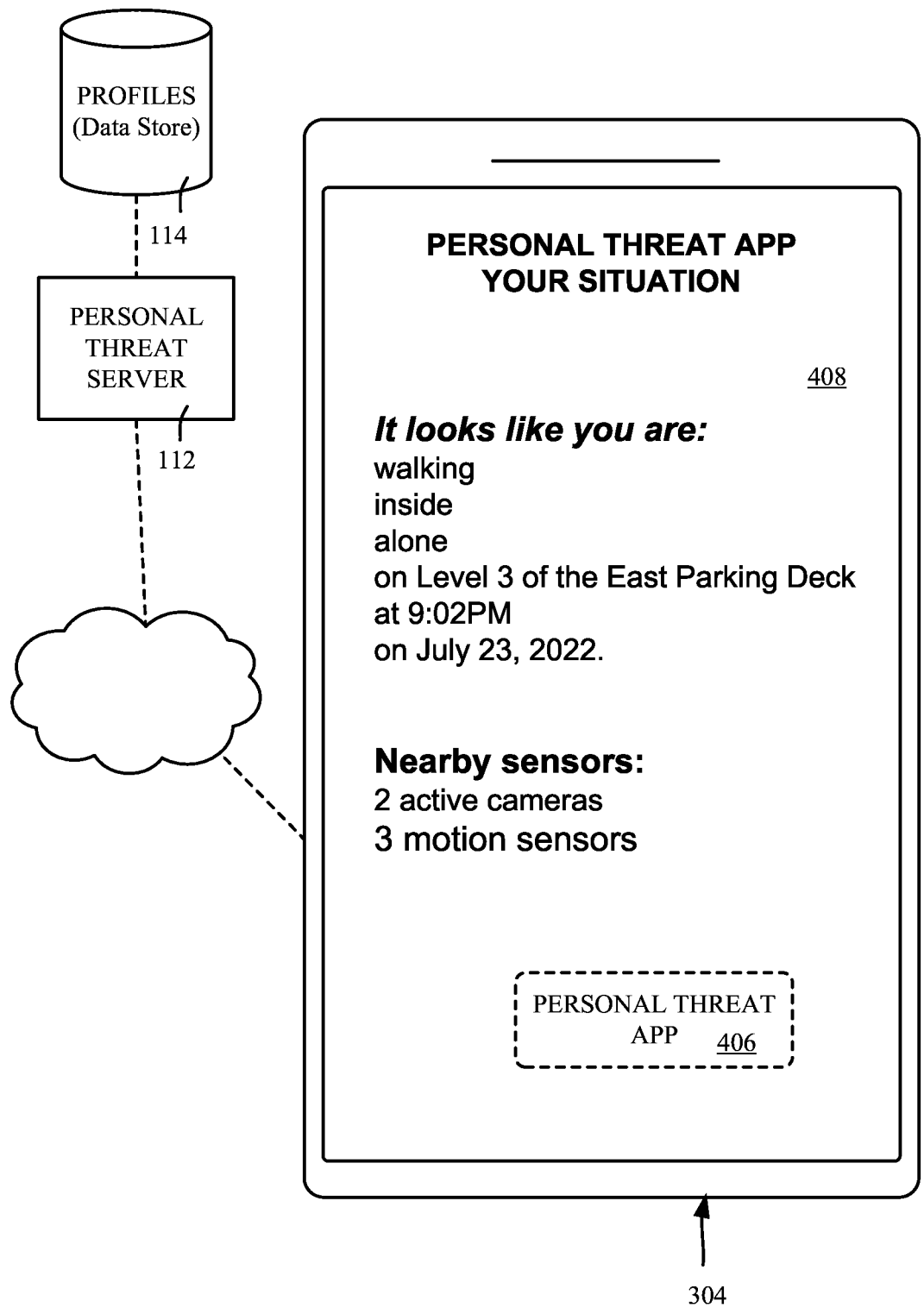
FIG. 4 is a representation of an example user interface by which the user (e.g., of FIG. 3) can view his or her current situation, in accordance with various aspects and embodiments of the subject disclosure.

FIGS. 3 and 4 show another example with respect to determination of a user's situation for a different user 302. Via this user's device 304, the user's instance of the personal threat app 406 in communication with the personal threat server 112 makes a determination of the user's situation, e.g., walking, inside, alone, on Level 3 of the East Parking Deck at 9:02 PM on Jul. 23, 2022. Further, two active cameras and three motion sensors are determined to be nearby the user's current location.

Thus, using various sensor data the user may be predicted to exist within an enclosure of some sort. For example, the enclosure may be the interior of a building, a parking deck, a sports stadium, their vehicle, a rideshare vehicle, or other enclosure. A detected enclosure may be defined to be a second-level zone 311 that comprises a set of X, Y, Z coordinates that go beyond the personal zone 310 defined by P1, such as to a zone including points that exist between P1 and P2. A zone can be defined to include all of the X, Y, Z coordinates of the enclosure, which may be obtained from a separate database. Thus, the entire parking deck level, or a building floor, can be defined as a separate personal zone. P2 may likewise be defined as a concentric spherical zone, or may be some other shape.

A personal zone or group of zones associated with a user can also be variable in size, as can be what is considered a threshold threat level. As one example, the threat level and/or the type of threat may be used to determine the dimensions of the personal zone or zones. For example, the time of day can be used to automatically enlarge the zone at night, when vision is typically reduced. A high crime area can automatically grow a personal zone. A user may have multiple zones, so that a lesser threat such as mosquitos in the area where the user is hiking may have a smaller zone than a zone defined with respect to another person getting close enough to the user to be considered a potential attacker. An extremely severe threat, such as a known/detected gunshot, while not necessarily imminent, can increase the personal zone size accordingly. The known presence of others can determine the threat level and/or zone size, as typically there is more danger when alone than in a crowd. A zone can vary based on the current situation; for example a running user will tend to encounter an upcoming potential threat ahead of the user faster than a walking user would reach the same potential threat.

Figure 5:
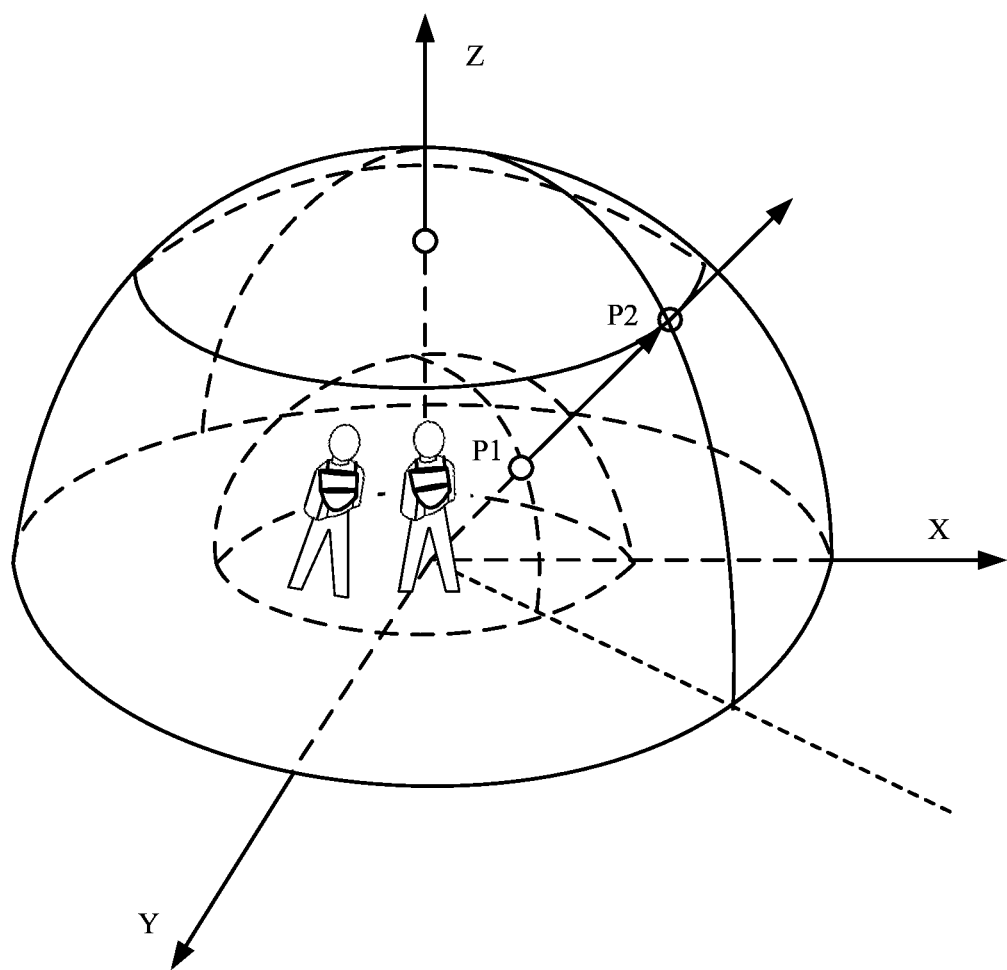
FIG. 5 is a representation of a user and companion within protective personal zones with respect to sensing one or more potential personal threats, in accordance with various aspects and embodiments of the subject disclosure.

As another example, what is considered a threshold threat level before warning the user can be variable. For example, in FIG. 5 the user is with a companion, whereby the threshold for alerting can be increased (and/or the personal zone size decreased). Many of these settings can be user configurable or configured by default based on machine learning/artificial intelligence or other data analysis.

Returning to the original "running alone . . . " example of FIGS. 1 and 2, with the user's situation having been determined, the system 100 may now identify any potential threats based on the situation, any sensed conditions, and any historical trends data or other data. To obtain condition data, as described herein, there can be historical data 116 accessed, as well as state data 118 obtained from remote sources that are relevant to the user's current conditions.

Further, there may be a number of onboard sensing capabilities that are used to sense conditions that may pose a threat. Such onboard sensing capabilities may include sensing functions that exist on the user's device or another device that they may carry or wear that may be in communication with the communication device 104, as well as other information from other sensors to which the device can obtain data. The device 104 may include or be coupled to sensors with sensing capabilities such as including, but not limited to, sensors for sensing air quality, electromagnetic levels, humidity level, ambient temperature, audio via a microphone (which may be an omnidirectional microphone), motion, ambient light levels, video, LIDAR (Light Detection and Ranging), sonar, other environmental sensors, and still others. Many such sensors can be coupled to the device, e.g., temperature can be sensed based on location and posted to a website.

For example, a microphone can detect a loud commotion nearby, even though not currently visible to the user or within the user's personal zone. A traffic camera can detect a speeding vehicle rapidly approaching the user, even if the vehicle is not yet within the user's personal zone.

Figure 6:
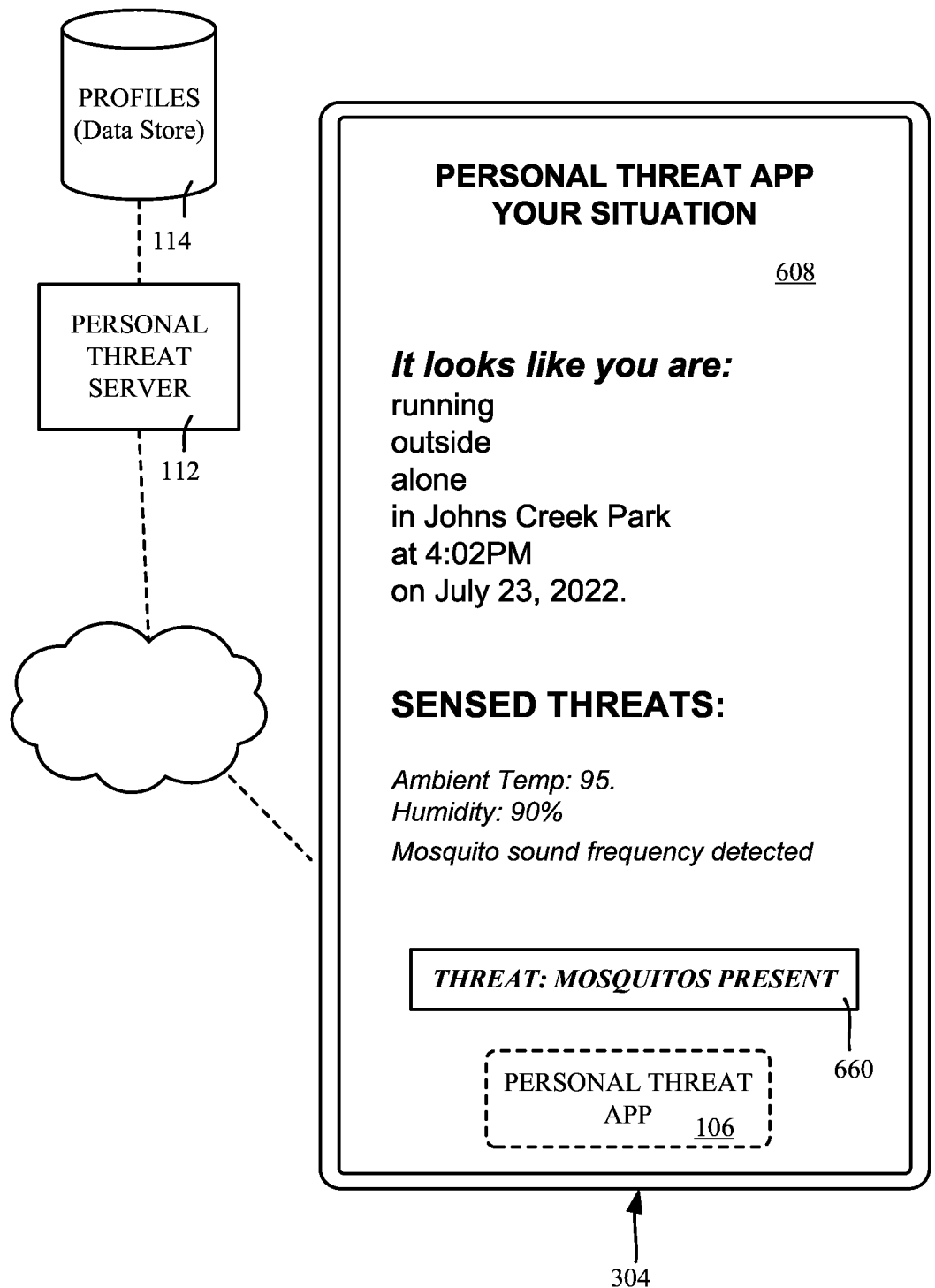
FIG. 6 is a representation of an example interactive user interface by which a user receives notification of a potential threat, in accordance with various aspects and embodiments of the subject disclosure.

In the example interface 608 of FIG. 6, the sensed data for the user includes (at least) the ambient temperature, the humidity, and the mosquito sound frequency. As such, the application 106 and/or server 112 can analyze this relevant data to determine that a threat of mosquitos is present, and output a suitable warning, e.g., alert 660.

Figure 7:
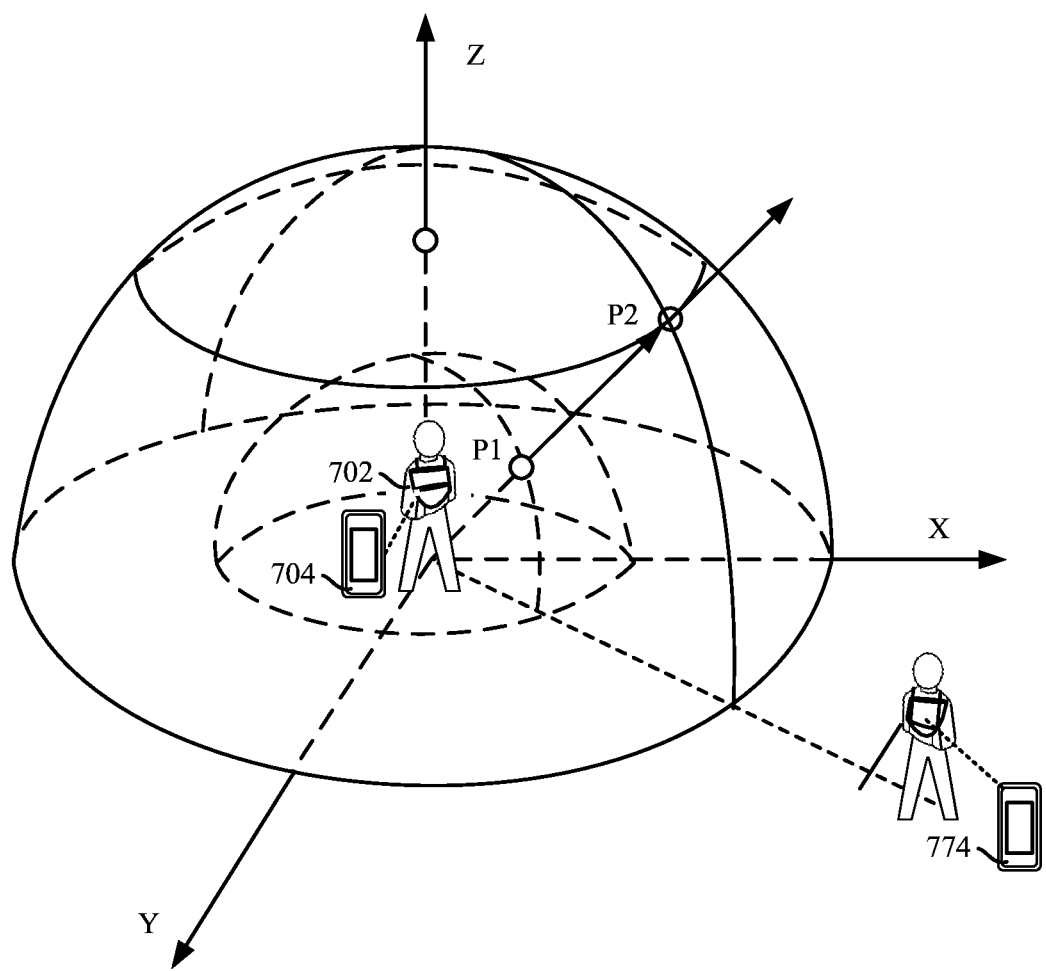
FIG. 7 is a representation of a user who can receive remotely sensed potential threat data based on data of another user, in accordance with various aspects and embodiments of the subject disclosure.

The personal threat server also may look for other devices with sensing capabilities that are proximate to a user that may be able to help sense conditions. For example, as represented in FIG. 7, it may be that a companion or nearby person with a device 774 may be registered with the personal threat server 112 and that other user's sensing capabilities and data may be stored in the personal threat server 112 and used to determine potential threats to the user 702 as well.

Sharing information can also be implemented. A user can watch another user's activity with respect to threat detection, e.g., a user watching a child or parent. Similarly, a second user may change the settings for threat levels of the first user—for example, a parent changing levels of a child or an elder parent based on their new location outside of their home. In another example, threat levels may also be modified by external events that are proximal to the user's location (e.g. an earthquake, or regional flooding, or locally detected pandemic or disease contact vector) or by matching a demographic or attribute of the user (e.g. a police based BOLO (be on the lookout) for certain victims fitting a profile). In yet another example, secondary sensors may confirm and increase or decrease the threat level initially proposed. Here, one camera (a satellite or low earth orbit camera) may detect perilous weather patterns or smoke in an area. However, cameras that are more proximal to the user (e.g. mounted on the side of a building or via a delivery drone passing overhead) may add more resolution and specificity to the location such that it is reduced for the exact user's location.

Figure 8:
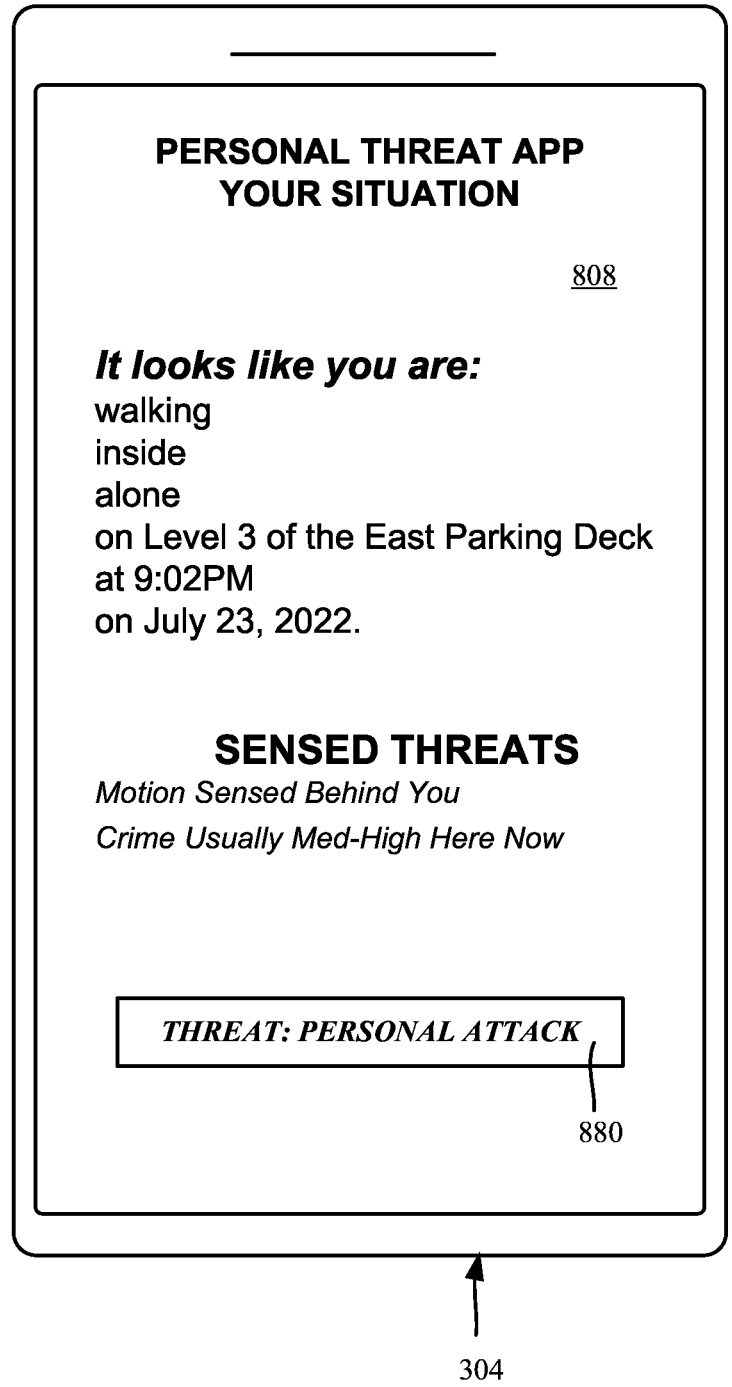
FIG. 8 is a representation of an example interactive user interface by which a user receives notification of a potential threat based in part on historical data, in accordance with various aspects and embodiments of the subject disclosure.

As described with reference to FIG. 1, the personal threat server 112 may also access historical data 116 to supplement the threat prediction at any time. For example, historical crime levels, historically bad locations for automobile accidents, historically highly polluted areas, and other such data may be used to aid in compiling a sensed threat assessment. In the example of FIG. 8, in addition to motion being sensed behind a user which increases the threat level to a user, the personal threat server 112 has obtained historical data indicating that the crime statistics are medium-to-high around this user's location which further increases the threat level. In this example, the motion detection analyzed in light of the crime statistics exceeds the threshold threat level for a personal attack, resulting in some action being taken, e.g., an alert 880 on the device 304.

As can be seen, the threat assessment may be made based on a combination of the sensed conditions, the predicted situation, and any historical data that may be available. The threat assessment may further optionally present an assessment of the user's threat potential within their personal zone P1, as well as within an enclosure zone or otherwise defined area zone that extends beyond P1. For example, the mosquito threat shown in FIG. 6 may affect only the user's personal zone P1, but they may be safe within the broader zone P2. Other examples may yield opposite results.

Another aspect of the technology described herein is directed towards mounting a defense. The user's device may automatically, and/or in response to a request from the user, use capabilities that the device possesses to help mount a defense against the predicted threat. For example, in the case of mosquito detection, the user's device may emit ultrasonic audio that may serve as a repellent.

For defensive purposes, the personal threat server 112 and/or the user's device may also employ other proximate devices that are networked and are identified by the personal threat server 112 to be available to help mount a defense. For example, in the case of a threat of a personal attack to a user, nearby lights may be turned on, cameras may be activated or aimed towards the user, and so on. A vehicle rapidly approaching a pedestrian user can be used to turn on a flashing light, for example. The defense may also be accompanied by a warning that may be emitted. For example, if a camera is activated, a speaker on the user's device or near the camera (or elsewhere) may emit an audio warning to any potential predators that they are under surveillance, sound a loud alarm, and so forth.

The technology described herein may be used in any of a number of different types of other use cases. For example, a user may be warned if their ultraviolet radiation exposure is high from the sun, if they are in an area that experiences high electromagnetic radiation, if they are in a high pollution area with low air quality, if they are approaching an intersection that is known for a high rate of vehicle accidents, and others.

Figure 9:
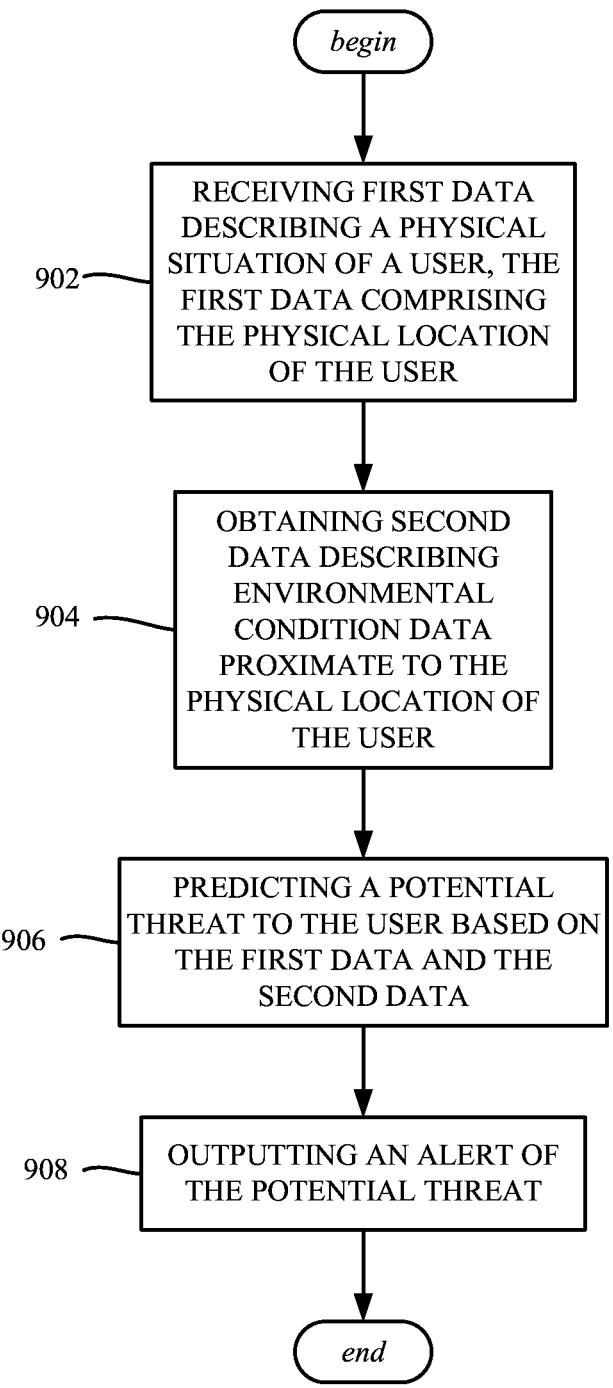
FIG. 9 is a flow diagram representing example operations related to potential threat detection based on a user's physical situation data and environmental condition data proximate the user, in accordance with various aspects and embodiments of the subject disclosure.

One or more example aspects are represented in FIG. 9, and can correspond to a system, including a processor, and a memory that stores executable instructions and/or components that, when executed by the processor, facilitate performance of operations. Example operation 902 represents receiving first data describing a physical situation of a user, the first data comprising the physical location of the user. Example operation 904 represents obtaining second data describing environmental condition data proximate to the physical location of the user. Example operation 906 represents predicting a potential threat to the user based on the first data and the second data. Example operation 908 represents outputting an alert of the potential threat.

The first data further can include at least one of: user current activity data, time data, accompaniment data indicating whether the user is alone or with at least one other person, or position data indicating whether the physical location is outside or inside a structure.

Predicting the potential threat can include accessing historical data. The historical data can include at least one of: crime danger data, vehicle accident danger data, or health danger data.

Further operations can include obtaining information that defines a personal zone of the user, the personal zone corresponding to geographic coordinates.

Further operations can include obtaining first information that defines a first personal zone of the user, the first personal zone corresponding to first geographic coordinates, and obtaining second information that defines a second personal zone of the user, the second personal zone corresponding to second geographic coordinates. Predicting the potential threat can include at least one of: predicting a first potential threat with respect to the first personal zone, or predicting a second potential threat with respect to the second personal zone.

Outputting the alert of the potential threat can include displaying the alert on a device of the user.

Further operations can include operating to take a defensive action in response to the predicting the potential threat.

Obtaining the second data describing the environmental condition data can include obtaining motion sensing data indicating motion proximate the physical location.

Further operations can include obtaining sensor information that indicates a number of sensors proximate the physical location.

The user can be a first user, and further operations can include obtaining supplementary potential threat data from a second user, and wherein the predicting the potential threat to the first user is further based on the supplementary potential threat data.

The user can be a first user, and further operations can include sharing the potential threat data with a second user via a device associated with the second user.

Predicting the potential threat can include estimating a threat level, and further operations can include determining a personal zone corresponding to geographic coordinates proximate the physical location based on the threat level.

Figure 10:
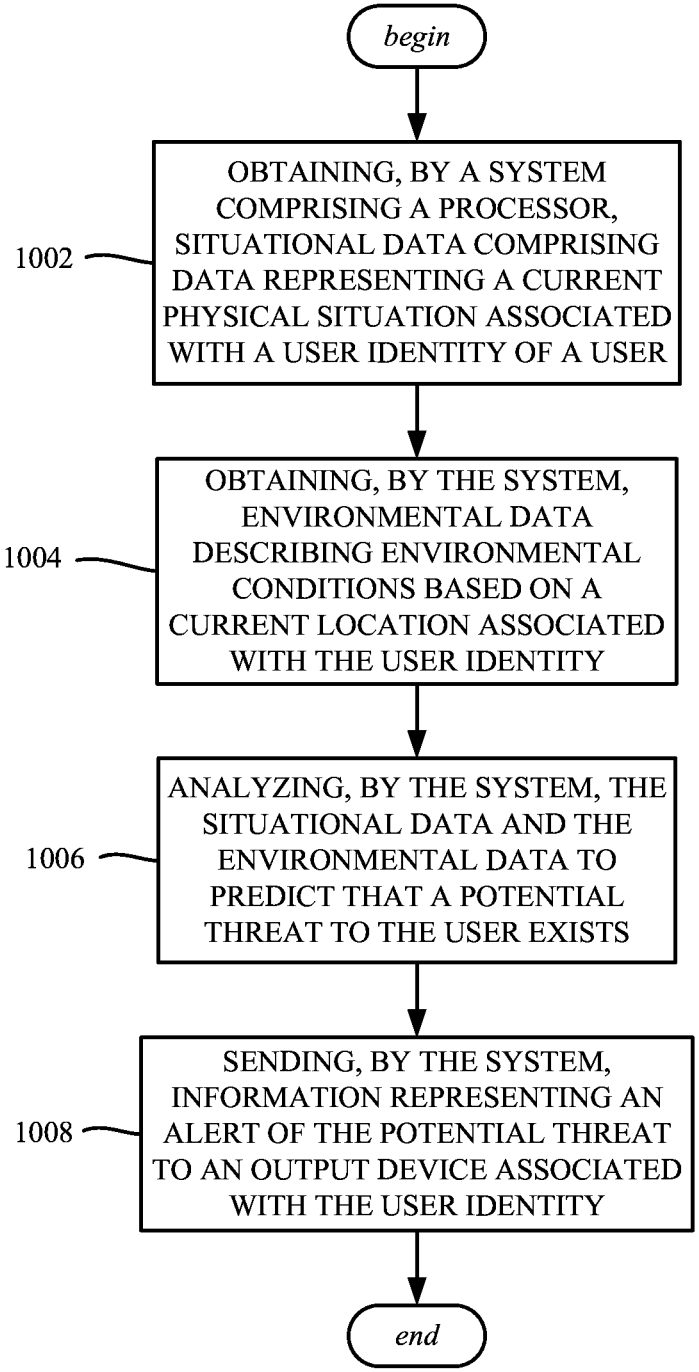
FIG. 10 is a flow diagram representing example operations related to threat detection and sending an alert based on analyzing a user's physical situation data and environmental condition data proximate the user, in accordance with various aspects and embodiments of the subject disclosure.

One or more example aspects are represented in FIG. 10, and, for example, can correspond to operations, such as of a method. Example operation 1002 represents obtaining, by a system comprising a processor, situational data comprising data representing a current physical situation associated with a user identity of a user. Example operation 1004 represents obtaining, by the system, environmental data describing environmental conditions based on a current location associated with the user identity. Example operation 1006 represents analyzing, by the system, the situational data and the environmental data to predict that a potential threat to the user exists. Example operation 1008 represents sending, by the system, information representing an alert of the potential threat to an output device associated with the user identity.

Further operations can include causing, by the system, output of a warning signal in response to the threat.

The analyzing can include accessing historical danger-related data, and analyzing the situational data and the environmental data in conjunction with the historical danger-related data.

Figure 11:
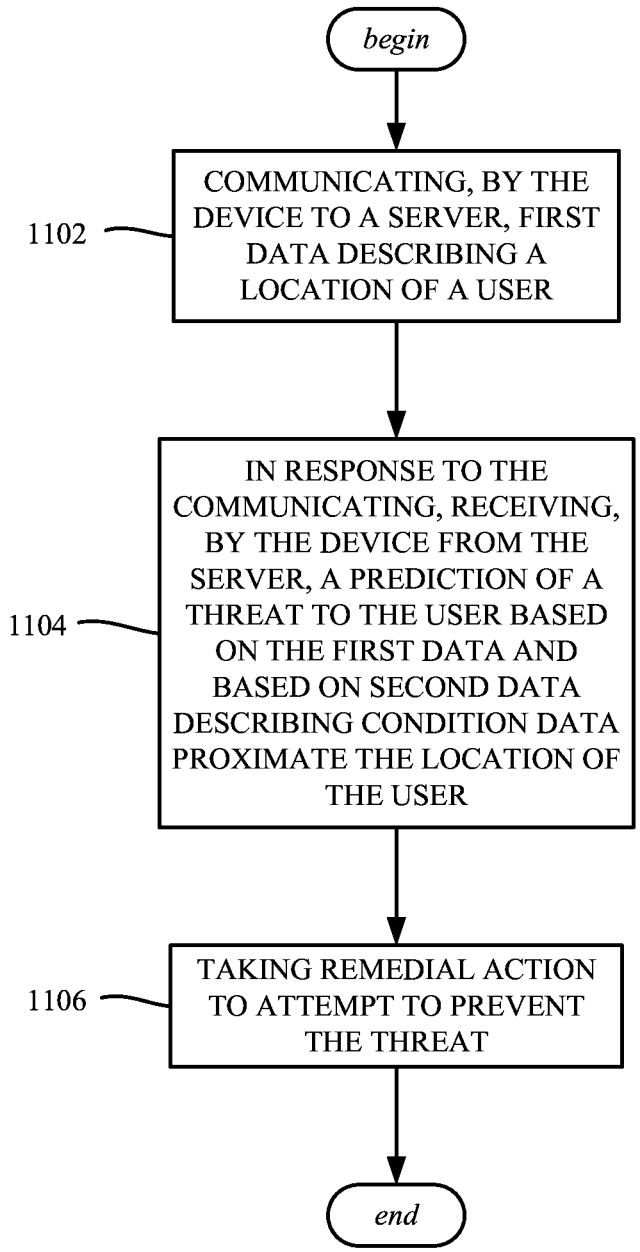
FIG. 11 is a flow diagram representing example operations related to takin remedial action to attempt to prevent a threat in response to a user's location data and condition data proximate the user, in accordance with various aspects and embodiments of the subject disclosure.

One or more aspects are represented in FIG. 11 such as implemented in a machine-readable medium, including executable instructions that, when executed by a processor of a device, facilitate performance of operations. Example operation 1102 represents communicating, by the device to a server, first data describing a location of a user. Example operation 1104 represents, in response to the communicating, receiving, by the device from the server, a prediction of a threat to the user based on the first data and based on second data describing condition data proximate the location of the user. Example operation 1106 represents taking remedial action to attempt to prevent the threat.

Taking the remedial action to attempt to prevent the threat can include outputting a warning via the device.

Taking the remedial action to attempt to prevent the threat can include outputting a warning via an alarm system proximate the location.

As can be seen, the technology described herein facilitates predicting the likelihood of a threat, and alerting the user of such threat. The technology described herein can provide data describing the nature of the threat to an electronic personal defense system that may be engaged to help protect the user.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 12:
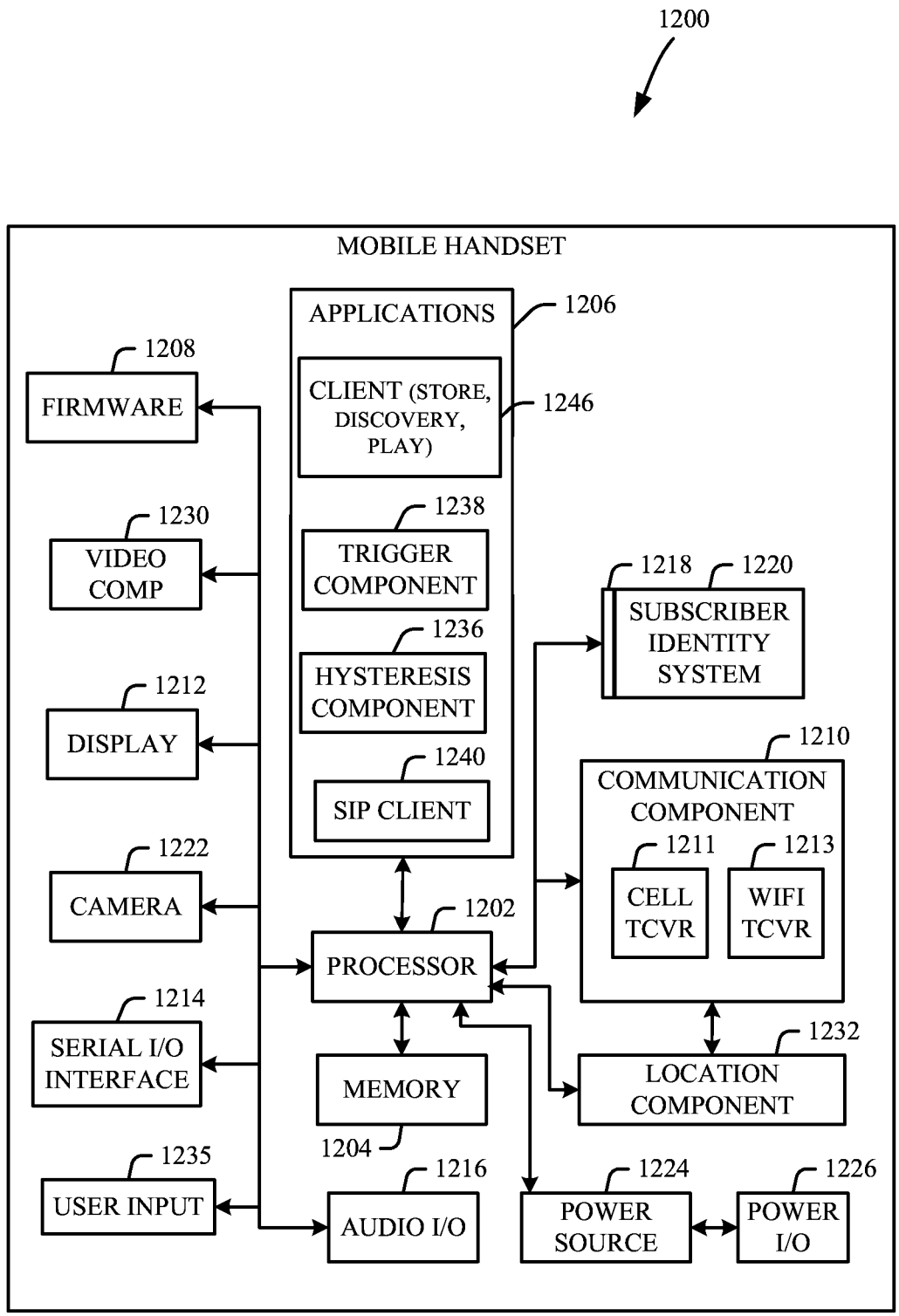
FIG. 12 illustrates an example block diagram of an example mobile handset operable to engage in a system architecture that facilitates wireless communications according to one or more embodiments described herein.

Referring now to FIG. 12, illustrated is a schematic block diagram of an example end-user device (such as user equipment) that can be a mobile device 1200 capable of connecting to a network in accordance with some embodiments described herein. Although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment1200 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset1200 includes a processor1202 for controlling and processing all onboard operations and functions. A memory1204 interfaces to the processor1202 for storage of data and one or more applications1206 (e.g., a video player software, user feedback component software, etc.). Other applications can include voice recognition of predetermined voice commands that facilitate initiation of the user feedback signals. The applications1206 can be stored in the memory1204 and/or in a firmware1208, and executed by the processor1202 from either or both the memory1204 or/and the firmware1208. The firmware1208 can also store startup code for execution in initializing the handset1200. A communications component1210 interfaces to the processor1202 to facilitate wired/wireless communication with external systems, e.g., cellular networks, VoIP networks, and so on. Here, the communications component1210 can also include a suitable cellular transceiver1211 (e.g., a GSM transceiver) and/or an unlicensed transceiver1213 (e.g., Wi-Fi, WiMax) for corresponding signal communications. The handset1200 can be a device such as a cellular telephone, a PDA with mobile communications capabilities, and messaging-centric devices. The communications component1210 also facilitates communications reception from terrestrial radio networks (e.g., broadcast), digital satellite radio networks, and Internet-based radio services networks.

The handset1200 includes a display1212 for displaying text, images, video, telephony functions (e.g., a Caller ID function), setup functions, and for user input. For example, the display1212 can also be referred to as a "screen" that can accommodate the presentation of multimedia content (e.g., music metadata, messages, wallpaper, graphics, etc.). The display1212 can also display videos and can facilitate the generation, editing and sharing of video quotes. A serial I/O interface1214 is provided in communication with the processor1202 to facilitate wired and/or wireless serial communications (e.g., USB, and/or IEEE-1394) through a hard-wire connection, and other serial input devices (e.g., a keyboard, keypad, and mouse). This supports updating and troubleshooting the handset1200, for example. Audio capabilities are provided with an audio I/O component1216, which can include a speaker for the output of audio signals related to, for example, indication that the user pressed the proper key or key combination to initiate the user feedback signal. The audio I/O component1216 also facilitates the input of audio signals through a microphone to record data and/or telephony voice data, and for inputting voice signals for telephone conversations.

The handset1200 can include a slot interface1218 for accommodating a SIC (Subscriber Identity Component) in the form factor of a card Subscriber Identity Module (SIM) or universal SIM1220, and interfacing the SIM card1220 with the processor1202. However, it is to be appreciated that the SIM card1220 can be manufactured into the handset1200, and updated by downloading data and software.

The handset1200 can process IP data traffic through the communication component1210 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component1222 (e.g., a camera) can be provided for decoding encoded multimedia content. The video processing component1222 can aid in facilitating the generation, editing and sharing of video quotes. The handset1200 also includes a power source1224 in the form of batteries and/or an AC power subsystem, which power source1224 can interface to an external power system or charging equipment (not shown) by a power I/O component1226.

The handset1200 can also include a video component1230 for processing video content received and, for recording and transmitting video content. For example, the video component1230 can facilitate the generation, editing and sharing of video quotes. A location tracking component1232 facilitates geographically locating the handset1200. As described hereinabove, this can occur when the user initiates the feedback signal automatically or manually. A user input component1234 facilitates the user initiating the quality feedback signal. The user input component1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 810, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
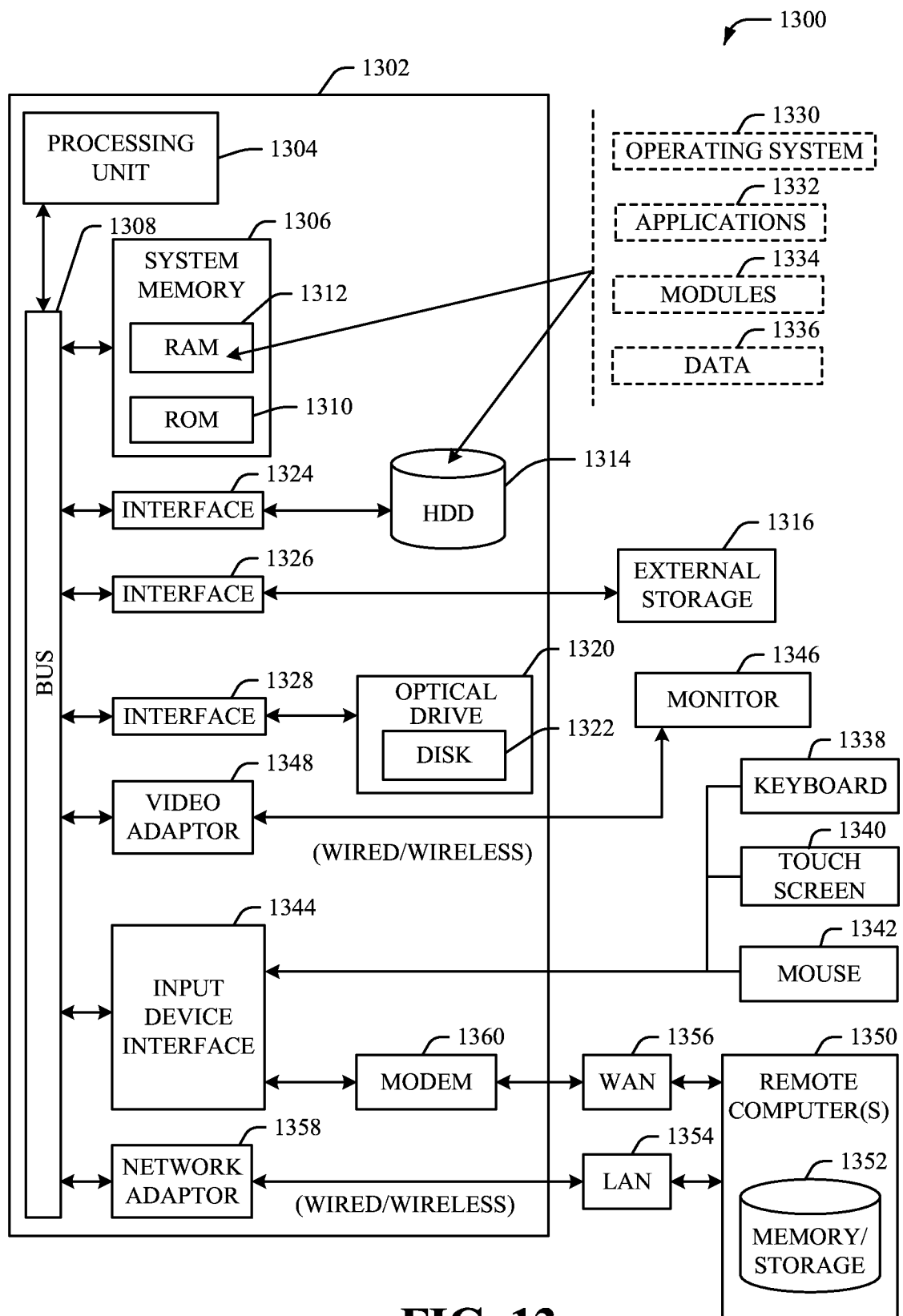
FIG. 13 illustrates an example block diagram of an example computer/machine system operable to engage in a system architecture that facilitates wireless communications according to one or more embodiments described herein.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD), non-volatile memory and other storage technology could be used in addition to, or in place of, an HDD 1314, and can be internal or external. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE-1394) interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally include emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can include one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE-1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 13 Mbps (802.11b) or 84 Mbps (802.11a) data rate, for example, or with products that contain both bands (dual band), so the networks can provide real-world performance similar to the basic "10 BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor of the system, facilitate performance of operations, the operations comprising:
   receiving first data describing a physical situation of a user, the first data comprising a physical location of the user;
   obtaining second data describing an environmental condition proximate to the physical location of the user;
   obtaining first information that defines a first personal zone of the user, the first personal zone corresponding to first geographic coordinates;
   obtaining second information that defines a second personal zone of the user, the second personal zone corresponding to second geographic coordinates;
   predicting a potential threat to the user based on the first data and the second data, wherein the predicting the potential threat comprises at least one of: predicting a first potential threat with respect to the first personal zone, or predicting a second potential threat with respect to the second personal zone; and
   outputting an alert of the potential threat.

2. The system of claim 1, wherein the first data further comprises user current activity data.

3. The system of claim 1, wherein the predicting the potential threat further comprises accessing historical data.

4. The system of claim 3, wherein the historical data comprises at least one of: crime danger data, vehicle accident danger data, or health danger data.

5. The system of claim 1, wherein the outputting the alert of the potential threat comprises displaying the alert on a device of the user.

6. The system of claim 1, wherein the operations further comprise operating to take a defensive action in response to the predicting the potential threat.

7. The system of claim 1, wherein the obtaining the second data describing the environmental condition comprises obtaining motion sensing data indicating motion proximate the physical location.

8. The system of claim 1, wherein the operations further comprise obtaining sensor information that indicates a number of sensors proximate the physical location.

9. The system of claim 1, wherein the user is a first user, wherein the operations further comprise obtaining supplementary potential threat data from a second user, and wherein the predicting the potential threat to the first user is further based on the supplementary potential threat data.

10. The system of claim 1, wherein the user is a first user, and wherein the operations further comprise sharing the potential threat with a second user via a device associated with the second user.

11. The system of claim 1, wherein the predicting the potential threat further comprises estimating a threat level, and wherein the operations further comprise determining a personal zone corresponding to geographic coordinates proximate the physical location based on the threat level.

12. The system of claim 1, wherein the first data further comprises time data.

13. The system of claim 1, wherein the first data further comprises accompaniment data indicating whether the user is alone or with at least one other person.

14. The system of claim 1, wherein the first data further comprises position data indicating whether the physical location is outside or inside a structure.

15. A method, comprising:
obtaining, by a system comprising a processor, situational data representing a current physical situation associated with a user identity of a user, wherein the situational data comprises accompaniment data indicating whether the user is alone or with at least one other person;
obtaining, by the system, environmental data describing environmental conditions based on a current location associated with the user identity;
analyzing, by the system, the situational data and the environmental data to predict that a potential threat to the user exists; and
sending, by the system, information representing an alert of the potential threat to an output device associated with the user identity.

16. The method of claim 15, further comprising causing, by the system, output of a warning signal in response to the threat.

17. The method of claim 15, wherein the analyzing comprises accessing historical danger-related data, and analyzing the situational data and the environmental data in conjunction with the historical danger-related data.

18. A non-transitory machine-readable medium, comprising executable instructions that, when executed by a processor of a device, facilitate performance of operations, the operations comprising:
communicating, by the device to a server, first data describing a location of a user;
in response to the communicating, receiving, by the device from the server, a prediction of a threat to the user based on the first data, based on second data describing user current activity, and based on accompaniment data indicating whether the user is alone or with at least one other person; and
taking remedial action to attempt to prevent the threat.

19. The non-transitory machine-readable medium of claim 18, wherein the taking the remedial action to attempt to prevent the threat comprises outputting a warning via the device.

20. The non-transitory machine-readable medium of claim 18, wherein the taking the remedial action to attempt to prevent the threat comprises outputting a warning via an alarm system proximate the location.

* * * * *